(12) United States Patent
Garcia

(10) Patent No.: US 10,499,199 B2
(45) Date of Patent: *Dec. 3, 2019

(54) ZONING, LICENSE, AND POSITION MATCHING TO PROVIDE SERVICE

(71) Applicant: Nicolas Garcia, New York, NY (US)

(72) Inventor: Nicolas Garcia, New York, NY (US)

(73) Assignee: Nicolas Garcia, Kathleen, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/313,102

(22) PCT Filed: Jun. 16, 2017

(86) PCT No.: PCT/US2017/038020
§ 371 (c)(1),
(2) Date: Dec. 24, 2018

(87) PCT Pub. No.: WO2017/222943
PCT Pub. Date: Dec. 28, 2017

(65) Prior Publication Data
US 2019/0158984 A1 May 23, 2019

Related U.S. Application Data

(63) Continuation-in-part of application No. 15/189,144, filed on Jun. 22, 2016, now Pat. No. 9,530,141.

(51) Int. Cl.
*H04W 4/029* (2018.01)
*G06Q 30/00* (2012.01)
(Continued)

(52) U.S. Cl.
CPC ........... *H04W 4/029* (2018.02); *G06F 16/29* (2019.01); *G06F 16/9537* (2019.01); *G06Q 30/018* (2013.01); *H04W 4/027* (2013.01)

(58) Field of Classification Search
CPC ...... G06Q 30/02; G06Q 30/018; G06Q 50/16; G06Q 4/027; G06F 17/30241;
(Continued)

(56) References Cited

U.S. PATENT DOCUMENTS 8,977,284 B2 * 3/2015 Reed .................. H04W 8/02
455/456.1
9,510,320 B2 * 11/2016 Reed .................. H04W 8/02
(Continued)

OTHER PUBLICATIONS

Ahmad et al., Current technologies and location based services, 2017, IEEE, p. 299-304 (Year: 2017).*
(Continued)

*Primary Examiner* — McDieunel Marc

(57) ABSTRACT

Using a bi-directional transceiver, one can receive or provide a service. Location of the parties associated with respective transceivers is tracked and billing is made accordingly based on factors such as time spent returning to a vehicle, being inside or outside the location. Further, a location where a job is to be performed is checked for its zoning information to ensure that a person performing the job is not only licensed to perform the job, but licensed to work at a specific zoned location where not all who are licensed in the field are licensed to do so.

20 Claims, 4 Drawing Sheets

(51) Int. Cl.
*H04W 4/02* (2018.01)
*G06F 16/9537* (2019.01)
*G06F 16/29* (2019.01)

(58) Field of Classification Search
CPC ......... G06F 16/29; H04W 4/027; H04W 4/06; H04W 68/00; H04W 8/205; H04W 60/04; H04W 4/029; H04W 8/02; H04M 2250/10; H04M 1/0256; H04B 7/18541; G08B 25/008; B60K 35/00
See application file for complete search history.

(56) References Cited

U.S. PATENT DOCUMENTS

| | | | | |
|---|---|---|---|---|
| 9,549,388 | B2* | 1/2017 | Reed | H04W 8/02 |
| 9,642,024 | B2* | 5/2017 | Reed | H04W 8/02 |
| 9,674,653 | B2* | 6/2017 | Vaccari | H04W 4/02 |
| 9,918,196 | B2* | 3/2018 | Reed | H04W 8/02 |
| 2010/0062788 | A1 | 3/2010 | Nagorniak | |
| 2012/0316930 | A1 | 12/2012 | Clemenson | |
| 2015/0058233 | A1 | 2/2015 | Budlong | |
| 2015/0173617 | A1 | 6/2015 | Wolf | |
| 2017/0041813 | A1* | 2/2017 | Reed | H04W 8/02 |
| 2017/0098377 | A1* | 4/2017 | Marco | G06Q 10/063118 |
| 2017/0132540 | A1* | 5/2017 | Haparnas | G06Q 10/06311 |

OTHER PUBLICATIONS

Sun et al., Signal processing techniques in network-aided positioning: a survey of state-of-the-art positioning designs, 2005, IEEE, p. 12-23 (Year: 2005).*
Wieselthier et al., Energy-aware wireless networking with directional antennas: the case of session-based broadcasting and multicasting, 2002, IEEE, p. 176-191 (Year: 2002).*
Beher et al., The Rooftop Community Network: Free, High-Speed Network Access for Communities, 1999, IEEE, p. 1-17 (Year: 1999).*
D'Orey et al., Can ride-sharing become attractive? A case study of taxi-sharing employing a simulation modelling approach, 2015, IEEE, p. 210-220 (Year: 2015).*
D'Orey et al., Hail-a-Drone: Enabling teleoperated taxi fleets, 2016, IEEE, p. 774-781 (Year: 2016).*
Philippopoulos et al., ToD: An Intelligent Location-Based Transport Management System, 2007, IEEE, p. 793-798 (Year: 2007).*
Lalos et al., A Framework for Dynamic Car and Taxi Pools with the Use of Positioning Systems, 2009, IEEE, p. 385-391 (Year: 2009).*

* cited by examiner

ZONING, LICENSE, AND POSITION MATCHING TO PROVIDE SERVICE

FIELD OF THE DISCLOSED TECHNOLOGY

The disclosed technology relates generally to global positioning systems and, more specifically, to using same to direct service providers to locations.

BACKGROUND OF THE DISCLOSED TECHNOLOGY

Global positioning systems have become ubiquitous in phones and other devices which the majority of people in the United States now carry on their person at all times. These devices can be used to indicate to another person one's present location; thus, matching up a customer with a service provider has become common place, based on the location of each. For example, a person requiring a taxi ride uses his/her device, inputs the desired destination, and the message is sent out to another device. This second device is chosen based on its proximity to the first device and the ability of its operator to carry out the service.

The above works well for taxi services, but is limited to only them. The situation becomes more complex for other services. U.S. Pat. No. 9,143,896 to Bhaumik et al. discloses a concept of determining the location of a customer, the availability of at least one service agent near that location, and sending the agent. This requires a close relationship between the company providing the service and its service agent. The service agent is thus a direct employee operating on behalf of the company. This, therefore, is also likely, or is limited to, the service that a single company can provide.

U.S. Pat. No. 8,917,867 to Clayton et al. discloses a method of finding workers in a retail store and searching for one who can provide a certain service to a customer. While this reference discloses the concept of finding someone who can perform a specific task, this is within a single location 1 the provider is a direct representative of the retail store, and is also limited to a single location.

Other references also attempt to solve the problem, but none has been found which would fully solve the problems described above. Further advancement in the art is needed to bridge the gap between providers of services and those in need of same.

SUMMARY OF THE DISCLOSED TECHNOLOGY

The methods of the disclosed technology are described below from three different perspectives: the person requesting the service, the system which carries out the connection between the person ordering and the person providing the service, and, finally, the person providing the service. Each uses bi-directional transceivers (devices which send and receive electromagnetic waves in the form of packet-switched data), global positioning system receivers (devices which receive data from satellites and report a fixed position on the surface of the Earth), and, in some cases, other specialized equipment such as accelerometers.

In a method of providing on-site service, one receives from a first bi-directional transceiver via a network node (a device which receives a packet of data and resends the packet of data to another device via an electric, optical, or wireless communication device and/or method) a determination of a location. The location determination is based on one, or a plurality of: a) a global positioning system receiver in the bi-directional transceiver; b) an internet protocol address used by the bi-directional transceiver; or c) a physical address stored in the memory of the bi-directional transceiver. An address, or approximate address, is determined based on the received location. From a database (a physical device on which information is physically stored for later retrieval), zoning information for a region in which the address or approximate address resides is determined. A determination of a zoning type is then made. A request from the first bi-directional transceiver for a service to be performed at the location is made, and a second bi-directional transceiver via a second network node is instructed to travel to the location of the first bi-directional transceiver. This second bi-directional transceiver is associated with an account authorized to perform the service at a location corresponding to the zoning type determined for the area (approximate address) or address.

A step of receiving from the second bi-directional transceiver government-issued license information associated with an operator of the second bi-directional transceiver can also be carried out. The zoning can be selected from: residential (defined as designated for dwelling), commercial (defined as designated for business use), and industrial (defined as designated for manufacturing). Before a job is assigned to be carried out, additional steps may be required on the part of the second bi-directional transceiver, such as for commercial and industrial. For example, purchase orders may need to be filled out, tax information may need to be provided, or further confirmation about the ability to handle specific aspects of the job may be provided. Other additional steps can include calling ahead for verification of address, contacting an owner of the location other than an operator of said first bi-directional transceiver for authorization, and confirming authorization to work at such a location with a party unassociated with the first bi-directional transceiver.

When the location of the first bi-directional transceiver is only approximate, a query may be sent to the first bi-directional receiver as to whether the location is residential or commercial. The query may then be associated with the approximate location for future iterations of carrying out the method/further jobs requested at the location, or within a distance there-from which does not overlap with another known zoned place.

An accelerometer can be used to limit jobs. That is, when the accelerometer surpases a pre-determined threshold, it may not be possible to determine a location for a job, and a positioning system is therefore disabled. Either the job cannot be carried out, or an operator of an associated bi-directional transceiver must input an address.

Further, by way of determining the location via the GPS receiver, an amount of time at the location where the service is being performed can be established and used as a basis for determination of how much an owner or operator of the bi-directional transceiver used to request the service should be billed. This is based on the fixed location of the transceiver at the location where the service is being performed. Additionally, in this manner further aspects can be ascertained, such as how much time the person performing the job spent, for example, in a residence where work is being performed, outside the residence, and the like.

A method for providing on-site service at a location based on a zoning type for said location can include the steps of sending, using a bi-directional transceiver via a network node, license information corresponding to services offered by an operator of the bi-directional transceiver; wherein the license information indicates ability to perform the services offered based on zoning type. Using at least a global positioning system, location of the bi-directional transceiver is determined and periodically updated via a second network node with the location. Based on a location of of the bi-directional transceiver, a request to perform one service offered at a location associated with the zoning type associated with the license is is requested. Data is sent via a second network node indicating acceptance of performance of the service and directions are received to the location to perform the service.

A length of time that the bi-directional transceiver associated with the person who performs the service is determined. This is used to determine billing amount, in embodiments of the disclosed technology. If time spent performing a service is above (10%+) or well above (25%+), average time for the service to be performed in such a zoning type (e.g. "time to fix a leaking sink in a commercial zone"), then the entity carrying out the job may be warned. Further, the movements, via GPS, may be recorded during performance of the job, and if the job is being carried out with too much movement or too much entry and exit to a building (such as determined by loss of GPS signal) then a warning may be issued to the entity carrying out the service or pay for the time cut.

In another method of warning persons carrying out a service that they should work more efficiently, a point where the second transceiver dropped in velocity from a driving speed (35 kilometers per hour or higher) to zero within 500 meters of the location and then the transceiver entered or was at the location is recorded and designated as a base of operations. The number of times the second transceiver returns to the base of operations is recorded and compared to other like kind services (a service having the same name or same license and cost requirements to perform) previously performed. For example, in the case of tuning a piano, attention is paid to the maximum number of times the service provider is active, and upon determination that said second transceiver is returning to said base of operations more frequently than average, a message is sent warning of inefficiency in carrying out said service.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

Using a bi-directional transceiver, one can receive or provide a service. Location of the parties associated with respective transceivers is tracked, and billing is done accordingly, based on factors such as time spent returning to a vehicle, being inside or outside the location, and the like. Further, a location where a job is to be performed is checked for its zoning information to ensure that a person performing the job is not only licensed to perform the job, but licensed to work at a specific zoned location where not all who are licensed in a specific field are licensed to do so.

Embodiments of the disclosed technology are described below, with reference to the figures provided.

Figure 1:
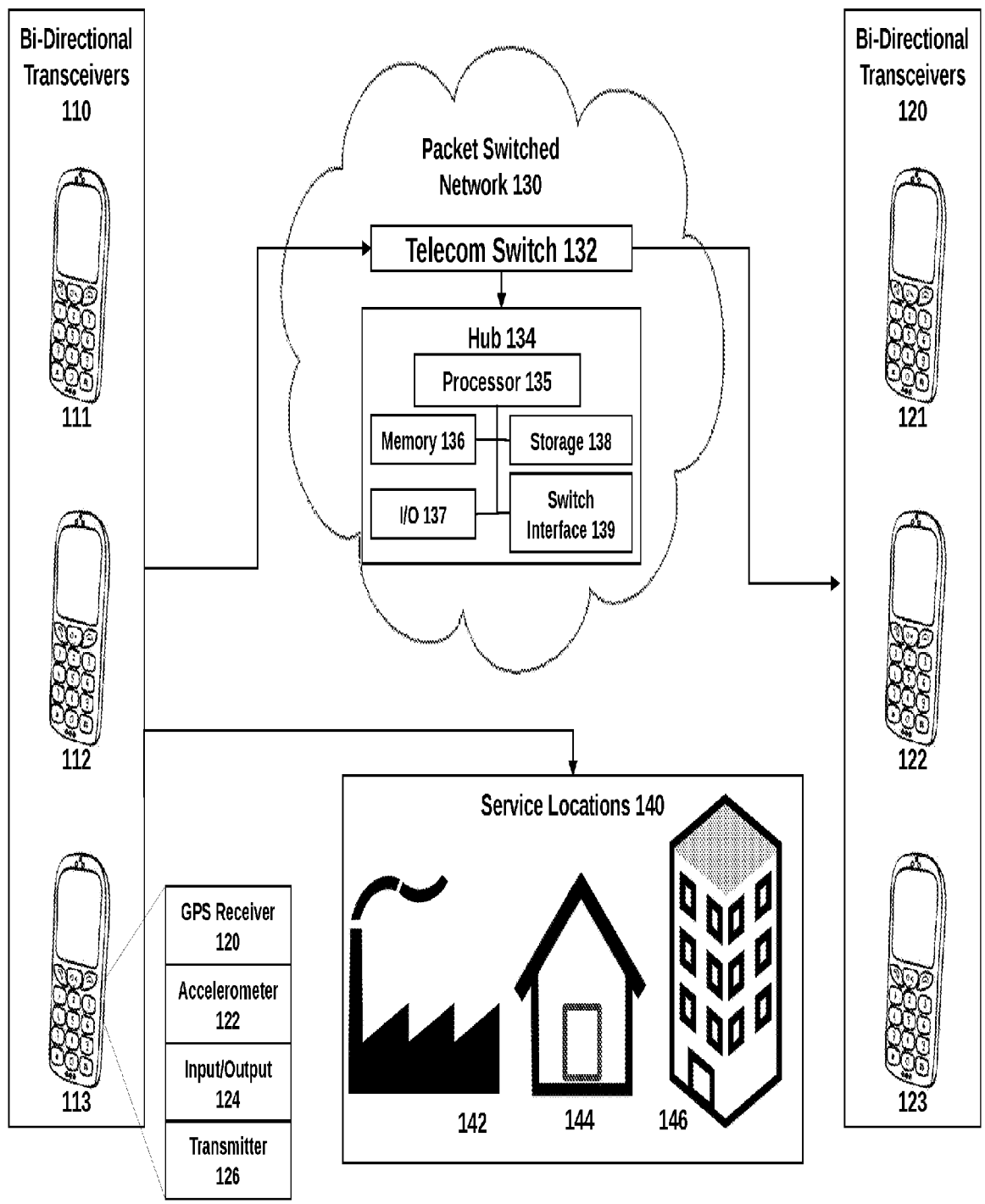
FIG. 1 is a high level block diagram of devices which are used to carry out embodiments of the disclosed technology.

Fig. 1 shows a high level block diagram of devices which are used to carry out embodiments of the disclosed technology. A plurality of bi-directional transceivers 110 and 120 is shown. Any number of each can be used. For purposes of description, three of each are shown. Thus, in the first set of bi-directional transceivers 110, transceivers 111, 112, and 113 are shown. In the second set of bi-directional transceivers 120, transceivers 121, 122, and 123 are shown. Each has some or all of the following elements: a GPS receiver 120, an accelerometer 122, input/ output mechanisms 124, and a transmitter 126.

The GPS (global positioning system) receiver 120 is a global positioning system receiver which receives data from global navigation satellites to determine location and reports this location information. The accelerometer 122 measures acceleration and, indirectly, distance, based on time at a rate of acceleration. Other location determination devices which can be used include the Internet protocol (IP address) of one the bi-directional transceivers 110 and/or 120, and looking up a location associated with the Internet protocol address, at least to determine a zoning type associated with the Internet protocol address, and thereby, the transceiver 110 or 120. This concept will be discussed further in the coming paragraphs. Further, location can be determined based on which cellular tower is used.

The input/output 124 refers to a keyboard, touch screen, display, and the like, used to receive input and send output to a user of the device. A transmitter 126 enables wireless transmission and receipt of data via a packet-switched network, such as packet-switched network 130. This network, in embodiments, interfaces with a telecommunications switch 132 which routes phone calls and data between two of the bi-directional transceivers 110 and 120. Versions of these data, which include portions thereof, can be transmitted between the devices. A "version" of data is that which has some of the identifying or salient information as understood by a device receiving the information. For example, a GPS receiver 120 may report location data in one format, and a version of these data can be reported via the packet-switched network 130 to a server. Both versions comprise location identifying data, even if the actual data are different in each case.

Referring again to the telecom switch 132, a device and node where data are received and transmitted to another device via electronic or wireless transmission, it is connected to a hub 134, such as operated by an entity controlling the methods of use of the technology disclosed herein. This hub has a processor 135 deciding how the bi-directional transceivers 110 and 120 are matched to each other, and which bi-directional transceiver 120 receives instructions to travel to a location and perform a service/job. This hub 134 further has memory 136 (volatile or non-volatile) for temporary storage of data, storage 138 for permanent storage of data, and input/output 137 (like the input/output 124), and an interface 139 for connecting via electrical connection to other devices.

Still discussing FIG. 1, service locations 140 are shown which have a variety of zoning types. Here, industrial 142, residential 144, and commercial 146 are shown by way of example. Some service providers, each associated with one of the bi-directional transceivers 120 (such as, for example, service provider 123) is licensed to perform in some or all zoning types. An air conditioning specialist might only be licensed for, or want to work on, residential air conditioning units. Thus, supposing that the operator of bi-directional transceiver 113 requests work on his or her air conditioning unit: if, during determination of the location provided by the bi-directional transceiver 113, it is found that the device is at a residential location, then device 123 might be suggested to accept the job. However, if the device is at a commercial location 146, then the transceiver 123 will not be offered to perform the job.

Zoning, for purposes of this disclosure, is defined as a legally recognized property type, according to the municipality, state, or country where service is requested. Types include residential, commercial, industrial, and other. Residential is broken down into single family, multi-family (4 families or fewer), and apartment buildings (5 families or more), and high-rise (5 story and higher). Residential is a place designed for living. Commercial is a location designated for work. Industrial is a location designated for heavy work or production. Other types include roads, which are divided into residential and highway and are delineated, in some embodiments of the disclosed technology, by speed limit or designation by a government authority. When seeking, for example, a service person to change a tire, some service providers are not legally allowed to perform such a service on a highway or a particular highway, such as a turnpike or parkway.

Licensing or being licensed to perform a service is defined as being approved by a government authority or trade union to perform a service which requires licensing for which performing the service at a specific location for a specific purpose is otherwise punishable by a fine or jail sentence. Examples include professional services (e.g., physician, computer repair), labor on a location itself (e.g., carpenter, plumber), and others.

Thus, in summary of FIG. 1, bi-directional transceivers 110 are operated by those who are seeking services. Bi-directional transceivers 120 are operated by those who are offering services. Based on licensing information provided to the hub 134 from the operators of the transceivers 120 and the location type for a person seeking a service at a service location 140, a service request is made to one of the transceivers 120, who then accepts and offers the service at a given location 140. The service performed is licensed, and the provider is legally able to provide the service at the type of location, based on its zoning.

Figure 2:
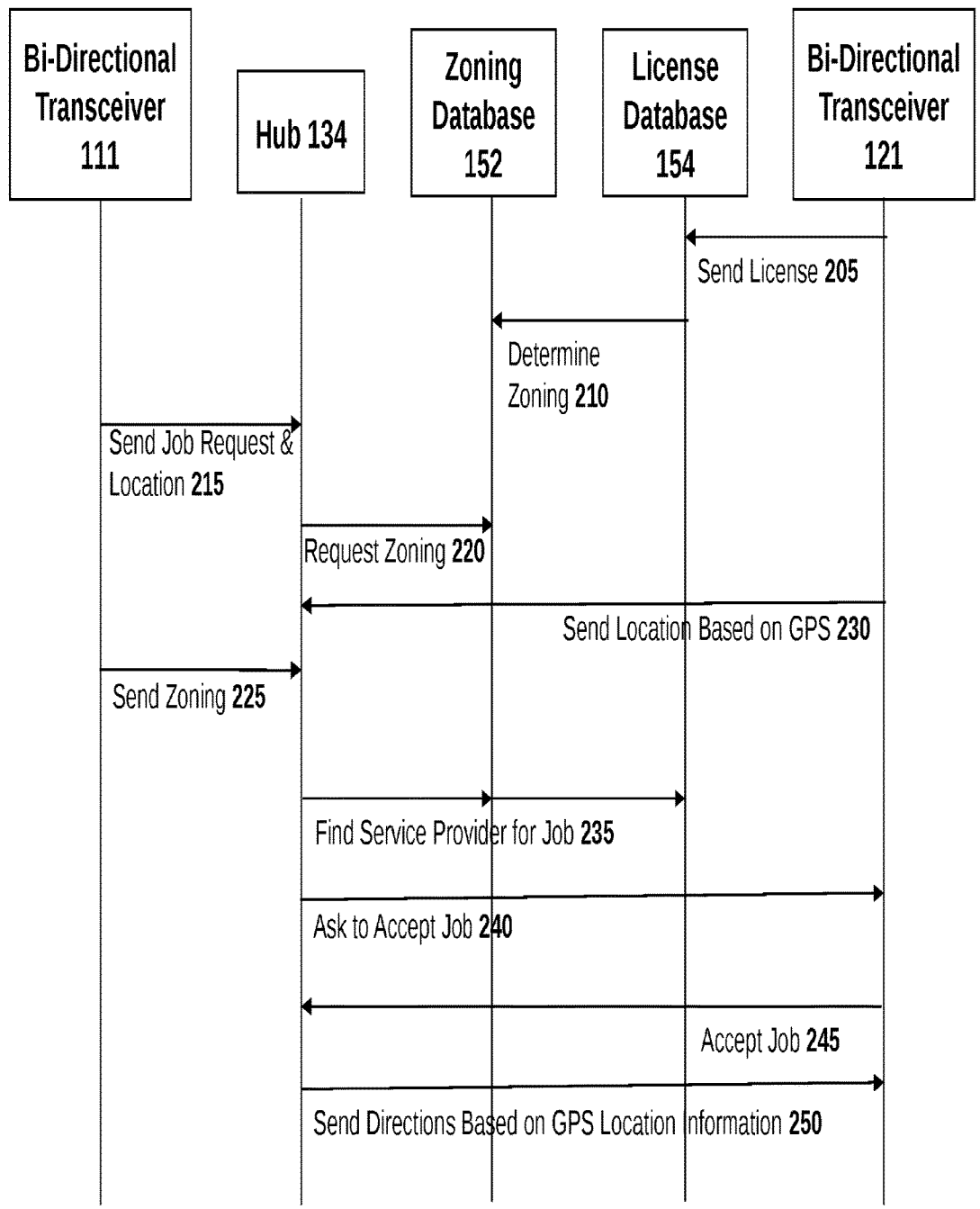
FIG. 2 is a diagram of devices used to carry out steps of the disclosed technology.

FIG. 2 shows a diagram of devices used to carry out steps of the disclosed technology. For purposes of this illustration, one of the bi-directional transceivers 111 associated with a person ordering a job /service is shown, as well as one of the bi-directional transceivers 121 associated with a service provider (see FIG. 1). It should be understood that any number of bi-directional transceivers can be used, as well as any number of people seeking jobs and performing jobs/services, with embodiments of the disclosed technology.

First, a bi-directional transceiver 121 is registered with a particular owner (such as by logging in to a user account on such a device). A license or qualifications of the owner is sent, in step 204, to a license database 154, where information about the owner is stored. Further, the owner, via the bi-directional transceiver 121, or another input mechanism, provides information about where he or she is zoned, in step 210, or would like to receive work. Thus, a particular ambulance company registering with the service may be authorized only in certain cities, only to operate in residential areas, or only to operate on a highway. Each of these can be entered as a type of government regulated or job performer limitation, to where he or she will, or can, legally, work. Such information is stored in a zoning database 152.

Once a bi-directional transceiver 121 with a global positioning system receiver and network connection is registered with a hub directing which jobs are assigned, its location is constantly or regularly pinged in step 230. Thus, whenever the operator/owner of the transceiver 121 is ready to receive a job, the transceiver transmits the location. When a person seeks to have a job carried out, such as in step 215, the transceiver 121 is at the ready to receive such a job.

A bi-directional transceiver 111 is an example of a transceiver controlled by a person seeking to have a job performed. The job request and its location are reported to the hub 134 in step 215. The nature of the job can be as described above, such as a job on specific premises/building/structure, a job on a specific person (e.g., massage, medical treatment, clothing measurement, haircut), or the like. The location of the bi-directional transceiver is reported over a wireless network connection as determined by a global position system receiver in the bi-directional transceiver 111, or entered by a user of the transceiver 111. The location can also be determined, with less specificity, based on which cellular tower received the job request. In some cases, this is enough to at least determine its zoning, or the exact address or GPS location is used.

Whatever information is provided, the hub 134 sends a request to the zoning database in step 220. The zoning database 152 provides data in two forms, in embodiments of the disclosed technology. First, the zoning database (which can be a plurality of separate databases) determines the zoning associated with the bi-directional transceiver 111 and its reported location. In some cases, where the location can only be resolved to 0.1 miles or greater, this may still be enough to determine whether the entire area is residential or likely to be so. Accelerometer data and, thereby, speed data, may also be provided by the bi-directional transceiver, thus determining that the bi-directional transceiver 111 is moving. In such cases, certain or all job types may not be offered, since zoning cannot be ascertained. The operator of the bi-directional transceiver 111 may have to be sent a request to enter an exact location where the job should be performed. The bi-directional transceiver 111 can also send its zoning data, in embodiments of the disclosed technology. For example, the hub 134 may send a query to the bi-directional transceiver over a packet-switched network to provide information related to the zoning. The owner/ operator of the transceiver 111 may receive a query such as, "Is this a single family house, apartment building, or commercial building?" The answer to this question, in the form of zoning information 225, is then sent to the hub 134.

Once a job location is secured and the zoning is determined by the hub 134, zoning database 152, or other devices acting with these devices, in step 235, seek out a service provider who can handle the job. The zoning database 152 is queried regarding those service providers which can handle a job in this zoning type, and the license database 154 is queried regarding service providers who are licensed to handle jobs of this type. The databases can be combined into one database or spread over multiple, different databases. Further, proximity to the bi-directional transceiver 111 (or address /location where the service is to be performed) matters. The hub 134 thus limits the search for someone to carry out the job by proximity to the job location, ability to legally perform the job, and desire/license to function in this particular zoning for this type of job. Once a bi-directional transceiver is found which matches each of these criteria (in this case transceiver 121), the operator thereof is asked to accept the job in step 240. Upon accepting the job in step 245, directions based on reported location information of the bi-directional transceiver 121 is sent in step 250.

Figure 4:
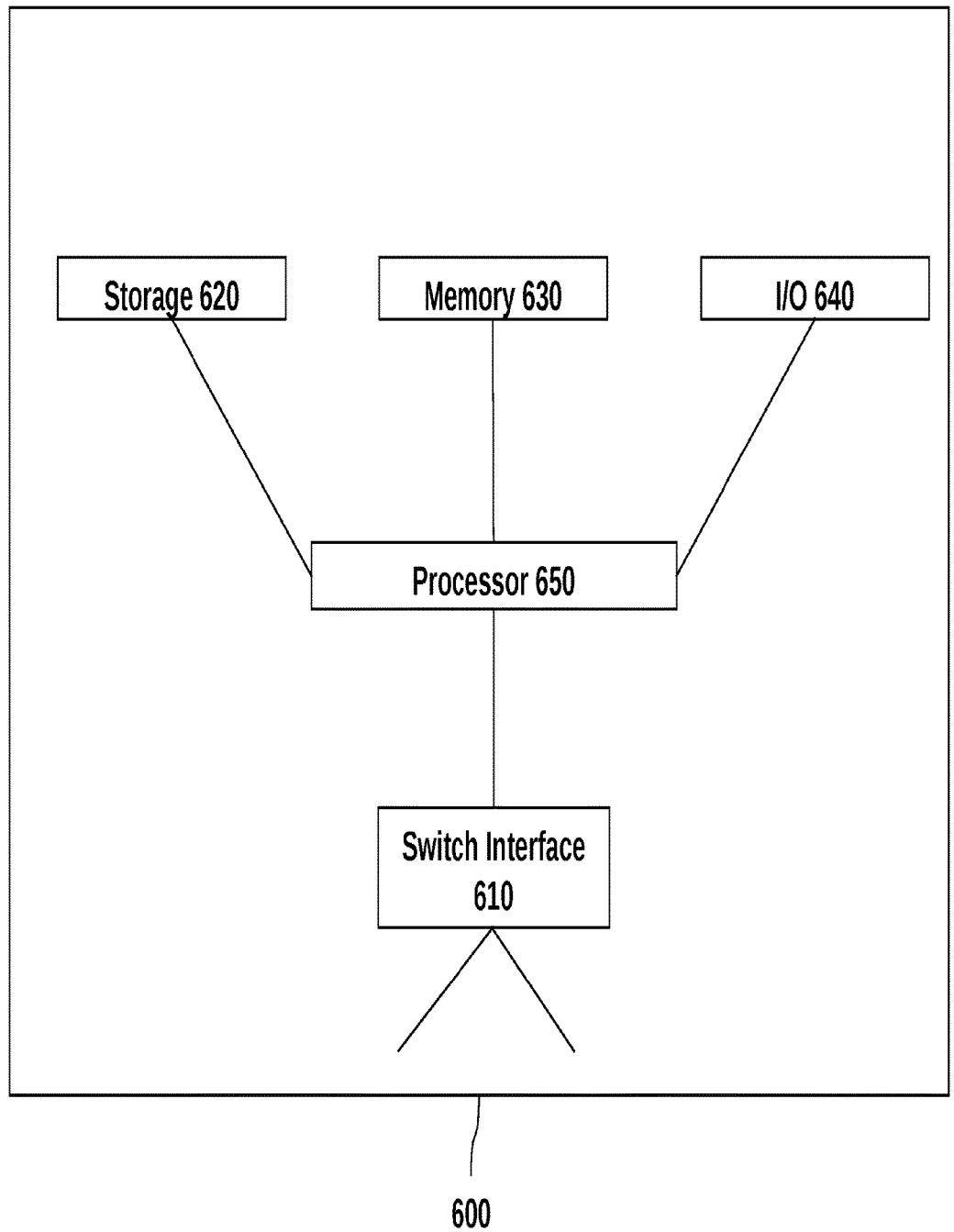
FIG. 4 shows a high-level block diagram of a device that may be used to carry out the disclosed technology.

FIG. 4 is a high level flow chart showing how methods of the disclosed technology can be carried out. First, in step 310, location information for a bi-directional transceiver associated with a person who wants a job to be carried out, is received. This can include the associated Internet protocol (IP) address 312, output from a GPS receiver 314, or data entered into the device via an input device 316, such as a microphone, touch screen, or keyboard. Acceleration information, in step 305, can also be received, such as from an accelerometer. This is because when the acceleration or change in distance (an integral of acceleration) is above a certain threshold (such as indicating that the device is moving 5 kilometers per hour or faster) than the location is changing, it can then be determined that the location of the bi-directional transceiver might not be the location where a job should be carried out. In such a case, either the bi-directional transceiver must stop. and this will be the location where a service should be performed by another, or the bi-directional transceiver must transmit data indicating a location where the service should be performed, such as by way of input device 316.

Based on the data received in step 310, a determination of an address, or approximate address, is made, and the zoning information, in step 325, is determined for this location or approximate location. If the zoning information cannot be determined, then step 335 is carried out, and a request for more accurate location information is made to the bi-directional transceiver. Once the location is known, a request can be received, in step 330, to perform a certain type of service or job, as previously described with reference to FIGS. 1 and 2.

In a separate chain of events, license information is received in step 340 for that which a service provider is able to carry out legally. This service provider uses, and is associated with, his or her own bidirectional transceiver which, in step 350, sends its location as reported by it's own GPS receiver. Based on the intersection of (a) closeness in location to where a service/job is requested, and (b) ability to legally perform such a service/job within such a zoned area, step 360 is carried out. In this step, the service provider is matched with the person seeking the service. In step 370, it is determined whether the job is accepted or not by the service provider and/or person seeking the service. When the job is accepted, in some embodiments, such as when dealing with a specific zoning type (e.g. "apartment complex/multi-family residential") the service provider must, before or after acceptance of the job, provide further data in step 380. This can be, for example, a work order or purchase order, a secondary confirmation with an owner or manager of the building versus with the owner of a specific unit in the building, confirmation that rules of the location will be followed, such as disposal of waste, noise, and work hours or the like.

In step 385, once the job is accepted by all sides and/or the service provider is en route to perform the job, the time is tracked, in embodiments of the disclosed technology. This includes tracing time from the service provider's starting point to the job location (step 390), tracking time at a base of operations 392, tracking time outside the physical structure of the location 394 (e.g., in the ambient air or outside a building), and time inside the building 396. The base of operations is the place where the service provider slows down from driving speed (greater than 40 kph, in embodiments) and stops. This is detected by the GPS or the accelerometer.

As such, it can be determined with precision by the GPS where the vehicle associated with the service provider, and therefore also his bi-directional transceiver, is located when arriving at the job. This can further be checked by determining the proximity between the bi-directional transceiver of the service provider and the location where the job is to be performed. Thus, a stop at a traffic light one mile away will not trigger a determination of where the base of operations is. Still further, the base of operations may be determined in retrospect only afterwards, based on a number of times at walking speed (less than 15 kph or 10 kph) that the bi-directional transceiver returned to the location where the velocity went down from driving speed to stopped, and/or an input in the bi-directional transceiver by the service provider that he/she has arrived at the location.

The determinations of time spent outside 394 and inside 396 can be made, in embodiments of the disclosed technology, by determining GPS signal strength and location. The location of buildings is received from a map or the strength and signal quality, or loss of signal indoors/sudden drop in signal can be used to indicate that a bi-directional transceiver is indoors, and/or the location where the signal abruptly changes (including loss of, or greater than, 30% signal strength reduction for one or two satellites) is a threshold position of indoors versus outdoors.

Figure 3:
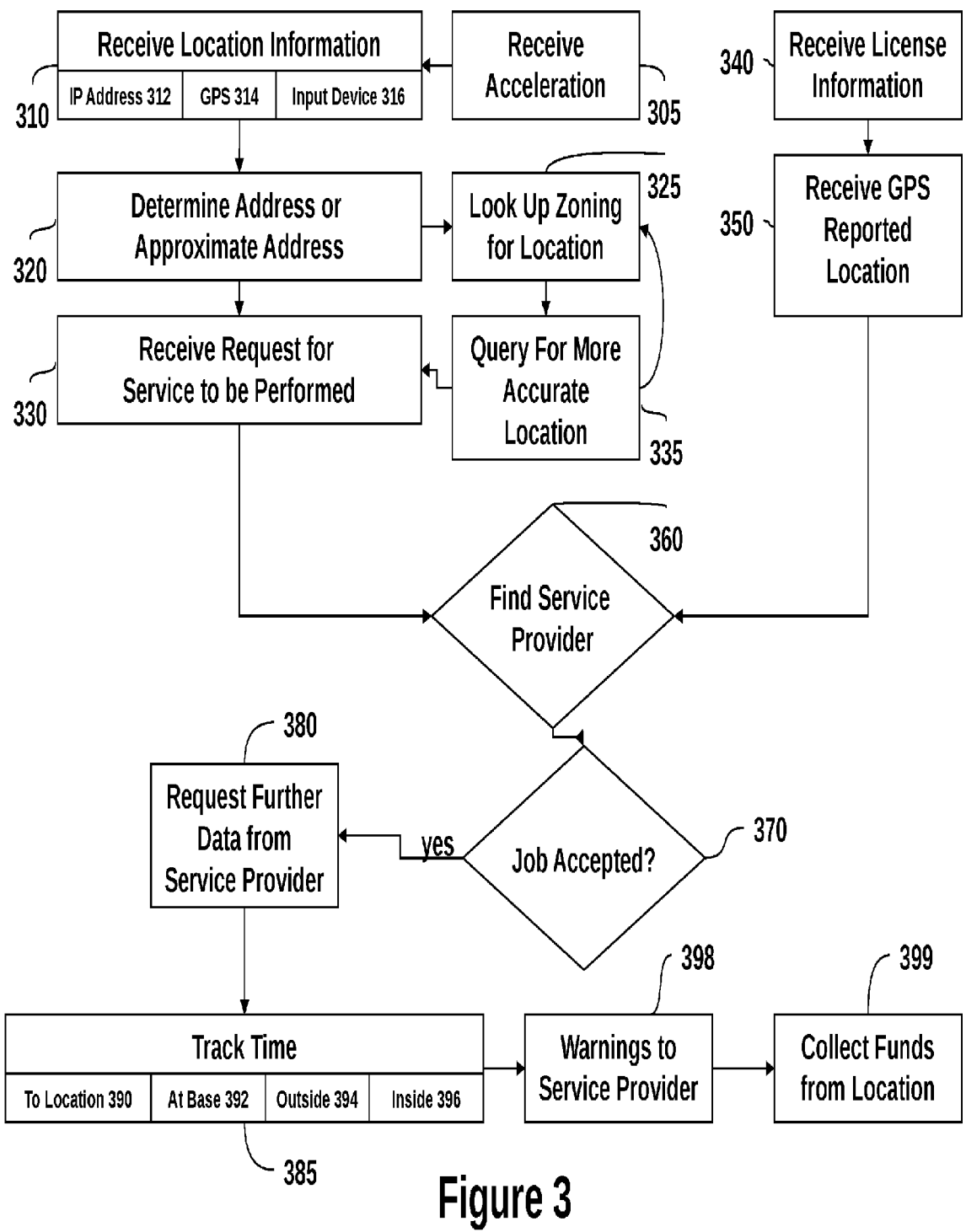
FIG. 3 is a high level flow chart depicting how methods of the disclosed technology are carried out.

All of the above can be used to determine how much to bill for the service and, in step 398, send warnings to the service provider. For example, suppose changing a light bulb should take zero trips back to the base location. The average electrician should therefore not return to the base until the job is completed. If he does, the electrician is warned that time is being wasted, and he will not be paid for this time. In a different example, suppose a mover has been hired to bring a sectional couch into the house, which couch was left by a prior delivery service on the front lawn. In such a case, it will take many trips from inside to outside and vice versa, and not result in a warning based on such a detection. A plumber may need to assess a situation and go back to his base of operations (vehicle, where parked) and this will be detected based on GPS output—perhaps two returns to the vehicle will be allowed. At three, a warning is given. At four, time is docked or pay is not granted for time outside, and even time inside is further scrutinized to ensure more time than necessary was not spent on the job. Finally, once all this is determined, in step 399 the funds are collected from the entity requesting the job and sent, at Fig. 4 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630 when execution of the console's program instructions is desired. Thus, the device's operation will be defined by the device's program instructions stored in memory 630 and/ or storage 620, and the console will be controlled by processor 650 executing the console's program instructions. A device 600 also includes one, or a plurality of, input network interfaces for communicating with other devices via a network (e.g., the internet). The device 600 further includes an electrical input interface. A device 600 also includes one or more output network interfaces 610 for communicating with other devices. Device 600 also includes input/output 640 representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device, for illustrative purposes. It should also be understood by one skilled in the art that the method and devices depicted in FIGS. 1 through 3 may be implemented on a device such as is shown in FIG. 4.

Further, it should be understood that all subject matter disclosed herein is directed and should be read only on statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described hereinabove are also contemplated and within the scope of the disclosed technology.

I claim:

1. A method of providing on-site service using a hub comprising the steps of: receiving from a first bi-directional transceiver via a network node a determination of a location, said determination of a location based on one or a plurality of: a) a global positioning system receiver in said bi-directional transceiver; b) an internet protocol address used by said bi-directional transceiver, c) a physical address stored in memory of said bi-directional transceiver; determining an address or approximate address based on said received location; receiving, from a database, zoning information for a region comprising said address or approximate address, and making a determination of a zoning type based there-on; receiving a request from said first bi-directional transceiver for a service to be performed at said location; sending to a second bi-directional transceiver via a second network node instructions to travel to said location of said first bi-directional transceiver, wherein said second bi-directional transceiver is associated with an account authorized to perform said service at a location corresponding to said determination of said zoning type.

2. The method of claim 1, further comprising a step of receiving from said second bi-directional transceiver government-issued license information associated with an operator of said second bi-directional transceiver.

3. The method of claim 1, wherein said zoning is selected from a zoning type consisting of at least two of residential, commercial, and industrial and additional steps are required for receipt from said second bi-directional transceiver for said zoning types of commercial and industrial compared to residential.

4. The method of claim 3, wherein said additional steps comprise at least two of calling ahead for verification of address, contacting an owner of said location other than an operator of said first bi-directional transceiver for authorization, and confirming authorization to work at such a location with a party unassociated with said first bi-directional transceiver.

5. The method of claim 1, wherein said service to be performed is limited to services available based on said zoning information.

6. The method of claim 1, wherein said location is determined based on said global positioning system, and said address determined is approximate; and a query is sent to said first bi-directional receiver about whether said location is residential or commercial.

7. The method of claim 6, wherein a response from said query is associated with said approximate location for future iterations of carrying out said method of claim 1.

8. The method of claim 1, wherein said first bi-directional transceiver further comprises an accelerometer and, when output from said accelerometer is above a pre-determined threshold, said determination of said location based on said global positioning system is disabled.

9. The method of claim 1, further comprising a step of determining based on a global positioning system receiver output of said second bi-directional transceiver an amount of time that said second bi-directional transceiver performed said service at said location, wherein said location is a fixed location throughout performance of said service.

10. The method of claim 9, further comprising comparing said time to previously carried out like kind services at a zoning time of said service performed at said location, and determining if time spent is higher than average, and reporting same to said second transceiver.

11. The method of claim 1, wherein a point where said second transceiver dropped in velocity to zero within 500 meters of said location is recorded and designated as a base of operations, and a number of times said second transceiver returns to said base of operations is recorded and compared to other like kind services previously performed; and upon determination that said second transceiver is returning to said base of operations more frequently than average, a message is sent warning of inefficiency in carrying out said service.

12. The method of claim 1, further comprising the step of the second transceiver receiving multimedia communications from the first transceiver.

13. The method of claim 12, further comprising the first transceiver receiving multimedia communications from the second transceiver.

14. A method for providing on-site service at a location based on a zoning type for said location using a hub, comprising the steps of: using a bi-directional transceiver via a network node license information corresponding to services offered by an operator of said bi-directional transceiver; wherein said license information indicates ability to perform said services offered based on zoning type; using at least a global positioning system to determine location of said bi-directional transceiver and periodically updating a server via a second network node with said location; receiving, based on a location of said bi-directional transceiver, a request to perform one said service offered at a location associated with said zoning type associated with said license; sending data via said second network node indicating acceptance of performance of said service; and receiving directions to a location for performance of said service, said directions updating based on location data provided by a global positioning system.

15. The method of claim 14, further comprising a step of periodically determining a location of said bi-directional transceiver via said global positioning system, and determining a length of said service based on a time when said location of said bi-directional transceiver is at said location for performance of said service.

16. The method of claim 15, wherein a price paid for said service corresponds to said time when said bi-directional transceiver is at said location.

17. The method of claim 16, wherein an amount of movement reported by said global positioning system at said location by said bi-directional transceiver is compared to like kind services and zoning types to determine if said price is accurate.

18. The method of claim 14, wherein said location is determined based on said global positioning system, and said address determined is approximate; and a query is sent to said first bi-directional receiver about whether said location is residential or commercial.

19. The method of claim 18, wherein a response to said query is associated with said approximate location for future iterations of carrying out said method of claim 1.

20. A method for connecting a service provider to a recipient using a hub by way of the following steps: determining which of a plurality of first bi-directional transceivers are associated each with a specific service provider; determining which services each said specific service provider is licensed to perform by receiving licensing information from each said specific service provider via a network node; receiving a version of output from a global positioning system receiver of each of said first bi-directional transceivers a location for each said specific service provider; receiving a request for a service to be performed from a second bi-directional transceiver; receiving a version of output from a global positioning system receiver of said second bi-directional transceiver indicating a location of said second bi-directional transceiver; determining a zoning type for said location of said second bi-directional transceiver; finding, based on said version of output from said global positioning system receiver of each of said first bi-directional transceivers said zoning type, and said services said specific service providers are licensed to perform, a closest service provider to said second bi-directional transceiver able to fulfill said request for said service, where said closest service provider is licensed to perform said service at said zoning type.

* * * * *